Patented Dec. 20, 1932

1,891,532

UNITED STATES PATENT OFFICE

ALLAN ROBERT GIBSON, OF BRISTOL, ENGLAND

PROCESS FOR EXTRACTING METALS FROM ORES, MINERALS, AND OTHER MATERIALS

No Drawing. Application filed November 24, 1930, Serial No. 497,843, and in Great Britain November 29, 1929.

This invention relates to a new or improved process for leaching or extracting metal values from ores, minerals, oxides, fumes or from other metals or materials with which the desired metals are combined or associated as for example by plating or alloying.

An object of the present invention is to provide a process by which various metals and/or metallic oxides may be economically leached from a wide variety of complex materials and wherein the solutions obtained are such that the said metals and/or oxides can be easily and economically recovered therefrom, and the leach liquors readily regenerated. Further the process does not require the use of elevated temperatures, and the leaching liquors by a simple variation of their constitution can be made highly selective in their action towards various metals.

Broadly the present invention consists in a process for extracting metal values from materials such as those first herein referred to by leaching with solutions containing ammonia ($NH_3$) and sulphur dioxide ($SO_2$).

According to a feature of this invention the leaching operation may be carried out in the cold without the application of heat from any external source. The leaching solution may be neutral, containing $NH_3$ and $SO_2$ in molecularly equivalent proportions or it may be basic with excess of $NH_3$ or acid with excess of $SO_2$, the acidity or basicity of the solution being determined according to the metals it is required to recover as will be shown hereinafter.

The process of the present invention differs from known leaching processes in which elevated temperatures are employed involving the expulsion of ammonia during the leaching stage and the consequent substitution of the metal for the ammonium radicle.

In the process of the present invention it is believed that the solubility of the desired values in general results from the formation of co-ordinate or ammino complexes and our experiments indicate that such complexes are formed at ordinary atmospheric or room temperature.

In carrying out the process it is preferable to conduct all operations with a minimum contact of the leach liquors with air, since in the presence of oxygen there is a tendency to oxidation of the leach l'quors with the consequent formation of sulphates of ammonia or of the metals, necessitating the recovery of any fixed ammonia by lime or caustic alkali.

The following brief description of the results of our experiments indicates the manner in which various metals and their oxides are dissolved by solutions containing $SO_2$ and $NH_3$ in varying proportions. The results are set out according to the groups of the Periodic Table.

*Group 1.*—Oxides of Cu, Ag and Au are attacked by both basic and acid leaching solutions the basic solution being the more effective.

*Group 2.*—Mg, Ca, Sr and Ba are soluble both in basic and acid solutions by displacement of $NH_3$, but not in the manner typical of this leach.

Oxides of Zn, Cd, and Hg are very strongly attacked by basic solutions and appreciably but more weakly attacked by acid solutions.

*Group 3.*—Metals and oxides of this group are not attacked by either basic or acid solutions.

*Group 4.*—Oxides of Sn and Pb are not affected.

Metallic Sn is actively attacked by acid solution.

Metallic Pb is not attacked.

*Group 5.*—Ox'des of V are attacked both by basic and acid solutions. Oxides of As, Sb and Bi are not attacked by basic solution but appreciably attacked by acid solution the attack being strongest with As and diminishing with the other metals of the group.

*Group 6.*—$CrO_3$ is actively attacked by acid solution. $Cr_2O_3$ is not actively attacked either by basic or acid solutions.

$Mo_2O_3$—$U_2O_3$ are attacked by acid leach, the attack being progressively greater with elements of higher atomic weight. These oxides are attacked to a less pronounced extent by basic solution, the attack being progressively less with elements of higher atomic weight.

*Group 7.*—Mn and MnO₂ are not appreciably attacked either by basic or acid solutions.

*Group 8.*—Fe, Fe₂O₃ and Pt are not attacked either by basic or acid solutions. Co and Ni oxides are appreciably attacked by basic solutions.

The above list is not intended to be exhaustive but indicates the application of the process to some of the more important metals and their oxides.

Various methods of recovering the metal values from solution may be employed. One convenient method comprises boiling the solution to remove excess ammonia and/or sulphur dioxide. The precipitate thus formed may then be calcined to obtain the metallic oxide or oxides, and the vapours driven off in both the boiling and calcining stages may be used to regenerate the leaching liquors.

An alternative method of recovery comprises the substantial neutralization of the solution by adding $NH_3$ or $SO_2$ as required. The resulting precipitate may be treated as in the previous method.

A further method comprises the recovery of the metal values in the form of substantially insoluble compounds such, for instance, as sulphides or hydroxides obtained by passing into the solution $H_2S$ or caustic alkali respectively. Again, the metal values may be recovered by electrolysis of the solutions containing them. This method of recovery equally with the last described method involving precipitation of insoluble compounds such as sulphides and the like gives direct regeneration of the leaching liquors.

As a still further alternative the metal values in solution may be recovered by methods involving the hydrolysis of the solution or precipitates to give metallic hydroxides or oxides with direct regeneration or reformation of the ammonia-sulphur dioxide leach liquor. These methods comprise respectively boiling the solution at a sufficiently elevated temperature, dilution of the solution in the cold with water and washing the precipitate obtained on boiling or neutralizing the solution under certain conditions as hereinafter more clearly explained with reference to definite examples.

The following are examples of some industrial processes in which the methods of the present invention may be very satisfactorily employed.

Extracting ZnO from blue powder, zinc dust or similar material. The method of this invention may also be used as a means of assaying the ZnO content of such material.

Extracting copper oxide from oxidized ores or other oxidized copper-bearing material—Recovery as copper oxide or alternatively as metallic copper.

Extracting metallic tin from tin plate or tin coated material—Recovery as stannic oxide.

Extracting arsenic and antimony oxides from oxidized copper-bearing materials.

Extracting vanadium oxide from oxidized ores.

Extracting nickel and cobalt from oxidized materials—Recovery as oxides or metals.

It may be stated that as a result of our experiments it appears that in all cases in which metallic oxides are leached by solutions containing $NH_3$ and $SO_2$ the corresponding hydroxides are equally amenable to this treatment.

It is obvious that when the material subjected to the leaching process contains several metals or metallic oxides attacked by the particular leaching liquor employed a complex solution results containing the several metals in varying degrees of concentration. If differential separation from such a solution is required a method of selective recovery may be employed comprising the addition to the solution of metallic dust of an electro-positive metal of a nature known to be soluble as oxide in the original leaching liquor.

In commencing the process of the present invention it is desirable in some cases to oxidize the material from which the metal or metals are to be extracted. For instance an ore containing zinc sulphide may be roasted to remove the sulphur and convert the zinc content to crude zinc oxide.

A marked difference of degree and even of kind of leach is observed on varying the relative proportions of ammonia and sulphur dioxide in the leach solution. Thus a solution containing $NH_3$ in excess of that required for the normal ammonium sulphite, while actively leaching zinc oxide, is inert towards certain materials such as metallic tin which in turn is strongly attacked by a solution containing $SO_2$ in excess of that required for the normal sulphite which acid solution does not attack zinc oxide as strongly as the alkaline solution.

It is to be observed that none of the solutions dissolves metallic iron or ferric oxide. In this connection the difference may be emphasized between the type of leach in accordance with this invention and those leaching processes in which solubility is effected by elimination of ammonia from solutions of its salts, and its replacement by the metal concerned. By such leaches—usually conducted at elevated temperatures—as for instance by use of an ammonium sulphate solution, ferric oxide is readily taken up. Ferrous iron is attacked to a sight extent by leaching in accordance with the present invention and if it is desired to use this process to effect an absolute separation from iron it is advisable completely to oxidize the iron to its higher state of oxidation before commencing the leach.

It is a further advantage of the methods of this invention that the materials of the leach solution are recoverable by simple means in a form suitable for regeneration of the leach liquors.

The following are examples of the use of this process showing more particularly the application of differential leaching to the recovery of the various metallic constituents of complex materials and the various ways in which the leach liquors may be regenerated.

EXAMPLE 1

The crude zinc oxide obtained from zinciferous materials by volatilization in any known type of furnace, as for instance the Waelz kiln, is leached in counter current with a solution containing 75 grammes per litre of $NH_3$ and 92.5 grammes per litre $SO_2$. The zinc oxide present is dissolved, such impurities as iron, lead, lime, etc. remaining undissolved. From one such leach the solution contained 8½% zinc and a trace of copper. The latter element was removed by the addition of sufficient zinc dust, leaving a solution of sensibly pure zinc ammino sulphite. On boiling and expulsion of a portion of the ammonia a crystalline precipitate of a basic zinc ammino sulphite separated out, leaving the solution substantially free from soluble zinc. On calcination these crystals decomposed yielding pure zinc oxide and ammonia and sulphur dioxide gases which latter were recovered, together with the ammonia expelled on boiling, by absorption in water to give fresh leaching solution. Alternatively the purified mother liquor has been dealt with by precipitation of the zinc as sulphide by the passage of $H_2S$, the leach liquor being directly regenerated.

An advantage to be noted here, is that both the zinc oxide prepared as above and the zinc sulphide are of pigment purity.

Zinc oxide prepared as above may also usefully be employed as a "filler" for rubber preparation or as a material from which to make pure zinc salts. It may also be employed for pharmaceutical purposes or as a material from which metallic zinc may be extracted.

A further modification of recovery from the leach liquor consists in passing sulphur dioxide gas through the mother liquor when a crystalline precipitate approximately corresponding to the formula $3ZnSO_3, ZnO, 4NH_4OH$ is obtained. Subsequent calcination yields the oxide as before.

It is to be understood that we do not attach importance to the actual composition of the zinc ammino sulphite compound obtained. This composition will vary considerably with the mode of precipitation, and in some cases, as for instance where precipitation is effected by the passage of $SO_2$, on the actual final condition of the liquor, the composition as above only being obtained on exact neutralization of the solution. Commonly if the zinc ammino sulphite is obtained by boiling the solution the precipitate will contain more ZnO and less $ZnSO_3$ owing to the hydrolysis of the zinc sulphite. If it is desired to produce a pure zinc oxide from the zinc ammino sulphite crystals by calcination it is preferable to carry this out at low temperature and in an inert atmosphere such as steam to obviate oxidation of the material with formation of zinc sulphate.

EXAMPLE 2

Tin leaching

A leach with solution containing 75 grams per litre $NH_3$ and 270 grams per litre $SO_2$ was applied to tinplate scrap in the cold. Active attack took place on the tinned surface and, after filtration, boiling the resultant filtered solution yielded a precipitate of stannic oxide in a gelatinous form substantially pure.

EXAMPLE 3

A mixed hydroxide material containing nickel, cobalt, copper, lead and iron.

A mud of hydroxides containing 20.72% Ni, 3.5% Co, 5.45% Fe, 8% Pb and 6.5% Cu was leached in the cold with a basic solution containing 80 grams per litre $SO_2$ and 60 grams per litre $NH_3$.

The leach dissolved the nickel, cobalt and copper to the exclusion of the lead and iron which remained behind as a residue of high lead value.

Of the metals leached, copper is the more strongly attacked by a basic leach and hence the early solutions contained more copper than nickel while the later solutions from the more spent mud were substantially copper free.

The copper present in the leach liquor was precipitated by treatment of the solution with nickel dust. The nickel and cobalt were then precipitated as sulphides by passing $H_2S$ which simultaneously regenerated the leach liquor.

Alternatively, after removal of the copper, the solution may be treated with caustic soda to precipitate the nickel and cobalt with expulsion of the ammonia which may be recovered.

To illustrate the manner in which preferential leaching of the copper takes place it may be mentioned that analysis of a liquor obtained early in the foregoing leach showed it to contain 10 grams per litre Cu and 5.34 grams per litre Ni despite the fact that in the original mud there was present three times as much nickel as copper.

EXAMPLE 4

An oxidized material containing, inter alia, copper, arsenic and antimony was submitted to a basic leach with a solution of the composition 80 grams per litre $SO_2$ and 60 grams per litre $NH_3$. Copper was actively leached out to the substantial exclusion of arsenic and antimony. In this manner substantially all the copper was removed from the material.

The residue was then submitted to an acid leach with a solution of the composition 75 grams per litre $NH_3$ and 270 grams per litre $SO_2$. The arsenic and antimony were actively leached out and almost completely removed from the material.

Alternatively the acid leach may precede the basic leach. In this case, although copper is affected by the acid leach it is not touched at all until the arsenic and antimony are substantially removed.

As stated above metal values may also be recovered from solution after leaching by methods involving hydrolysis. It has been stated in connection with Example 1 that if the solution obtained on leaching in that example be boiled, the zinc ammino sulphite will be partially hydrolized and the precipitate will contain more ZnO than $ZnSO_3$. If the temperature at which boiling is carried out is increased either by boiling at more than atmospheric pressure or by boiling at a surface of temperature greater than 100° C. as for instance by boiling at the surface of a drum immersed in the solution and containing superheated steam, the degree of hydrolysis which takes place is increased and according to our experiments by boiling at a temperature of 150° C. it is possible entirely to hydrolize the zinc compound irrespective of the proportions of $SO_2$ and $NH_3$ in the original leaching liquor. The immediate product of hydrolysis will be $Zn(OH)_2$ but at 150° C. this will be dehydrated to ZnO sufficiently rapidly to leave little or no $Zn(OH)_2$ in the precipitate.

A similar result may be obtained by diluting the solution obtained after leaching with water substantially at atmospheric temperature whereupon all or part of the zinc compound is hydrolized to $Zn(OH)_2$ the degree of hydrolysis being dependent on the actual composition of the original leaching liquor.

For example zinc ore was leached with the solution of Example 1 until the liquor was sensibly saturated with zinc. On dilution of the resulting solution with 30% of its volume of cold water precipitation of zinc as hydroxide commenced.

It appears that altering the absolute concentration of the leaching liquor does not greatly affect the degree of volume dilution required to bring about complete hydrolysis provided the proportions of $NH_3$ and $SO_2$ in the original liquor are unchanged.

In another case in a leach of sintered zinc ore with a solution containing 80 gm. per litre $SO_2$ and 59.5 gm. per litre $NH_3$ a concentration of 69.3 gm. per litre Zn was obtained. On dilution of this solution with three times its volume of cold water, hydrolysis took place with precipitation of finely divided $Zn(OH)_2$.

Solutions of metals obtained by leaching with liquors having compositions other than those most suited to subsequent hydrolizing of the metal in solution by boiling or dilution may in certain circumstances, on boiling or neutralization, precipitate crystals which after separation from the mother liquor hydrolize on washing with cold water to form hydroxides. These cases are exceptional since the precipitates formed when metal solutions obtained by leaching with ammonia—sulphur dioxide solutions are boiled or neutralized are in general substantially insoluble in and unaffected by water and may be washed without loss of the metal values.

It is to be understood that I do not in any way restrict myself to the specific examples given above which are quoted by way of illustration only and as indicating particular instances of manners of carrying out the process of the present invention.

What I claim is:—

1. A process for extracting metal values from metalliferous materials containing zinc, copper or tin values which comprises leaching the metalliferous material at ordinary temperature and with substantial exclusion of air with a solution containing ammonia and sulphur dioxide, one of the constituents of the solution being in excess according to the metal value it is required to extract.

2. A process for extracting metal values from metalliferous materials containing zinc, copper or tin which comprises leaching the metalliferous materials at ordinary temperature and with substantial exclusion of air with a solution containing ammonia and sulphur dioxide and subsequently boiling the solution to precipitate the metal value.

3. A process for extracting zinc values from metalliferous materials which comprises leaching said materials at ordinary temperature and with substantial exclusion of air with a solution containing ammonia and sulphur dioxide with the ammonia in excess.

4. A process for extracting copper values from metalliferous materials which comprises leaching said materials at ordinary temperature and with substantial exclusion of air with a solution containing ammonia and sulphur dioxide with the ammonia in excess.

5. A process for extracting tin values from tin bearing materials which comprises leaching said materials at ordinary temperature and with substantial exclusion of air with a solution containing ammonia and sulphur dioxide with the sulphur dioxide in excess.

6. A process for extracting zinc values from metalliferous materials which comprises leaching said metalliferous materials at ordinary temperature and with substantial exclusion of air with a solution containing ammonia and sulphur dioxide with the ammonia in excess and then substantially neutralizing the solution to recover the zinc values.

7. A process for extracting copper values from metalliferous materials which comprises leaching said materials at ordinary temperature and with substantial exclusion of air with a solution containing ammonia and sulphur dioxide with the ammonia in excess and subsequently precipitating the copper values by adding to the solution metallic dust of a metal electro-positive to copper and soluble as oxide in the original leach liquor.

ALLAN ROBERT GIBSON.